(12) United States Patent
Shabtay et al.

(10) Patent No.: US 8,233,073 B2
(45) Date of Patent: Jul. 31, 2012

(54) IMAGE CAPTURING DEVICE WITH IMPROVED IMAGE QUALITY

(75) Inventors: Gal Shabtay, Tel-Aviv (IL); Ephraim Goldenberg, Ahsdod (IL)

(73) Assignee: DitigalOptics Corporation Europe Limited, Ballybrit, Galway (IE)

( * ) Notice: Subject to any disclaimer, the term of this patent is extended or adjusted under 35 U.S.C. 154(b) by 758 days.

(21) Appl. No.: 12/225,591

(22) PCT Filed: Mar. 29, 2006

(86) PCT No.: PCT/EP2006/002861
§ 371 (c)(1),
(2), (4) Date: Apr. 1, 2009

(87) PCT Pub. No.: WO2007/110097
PCT Pub. Date: Oct. 4, 2007

(65) Prior Publication Data
US 2009/0225171 A1    Sep. 10, 2009

(51) Int. Cl.
*H04N 5/225* (2006.01)
*G03B 17/00* (2006.01)
(52) U.S. Cl. .................................... 348/340; 396/439
(58) Field of Classification Search .............. 396/71, 396/544; 348/340
See application file for complete search history.

(56) References Cited

U.S. PATENT DOCUMENTS

| | | |
|---|---|---|
| 4,554,585 A | 11/1985 | Carlson |
| 4,897,722 A | 1/1990 | Flory |
| 4,962,429 A | 10/1990 | Lemonier et al. |
| 5,124,840 A | 6/1992 | Trumbull et al. |
| 5,175,616 A | 12/1992 | Milgram et al. |
| 5,309,241 A | 5/1994 | Hoagland |
| 5,432,404 A | 7/1995 | Ogino et al. |
| 5,537,149 A | 7/1996 | Teraoka et al. |
| 5,668,666 A | 9/1997 | Suzuki et al. |
| 5,673,086 A | 9/1997 | Fukuoka et al. |

(Continued)

FOREIGN PATENT DOCUMENTS

CN    1739118 A    2/2006

(Continued)

OTHER PUBLICATIONS

Japanese Office action dated Feb. 14, 2012 for JP 2009-501859; Shabtay, et al.

*Primary Examiner* — Clayton E Laballe
*Assistant Examiner* — Leon W Rhodes, Jr.
(74) *Attorney, Agent, or Firm* — Lee & Morse, P.C.

(57) ABSTRACT

An image capturing device (1) is disclosed comprising an electronic image detector (17) having a detecting surface (15), an optical projection system (5) for projecting an object within a field of view onto the detecting surface (15), and, optionally, a computing unit (19) for manipulating electronic information obtained from the image detector (17), wherein, the projection system (5) is adapted to project the object in a distorted way such that, when compared with a standard lens system, the projected image is expanded in a center region of the field of view and is compressed in a border region of the field of view. Preferably, the projection system (5) is adapted such that its point spread function in the border region of the field of view has a full width at half maximum corresponding essentially to the size of corresponding pixels of the image detector (17).

23 Claims, 5 Drawing Sheets

U.S. PATENT DOCUMENTS

| | | |
|---|---|---|
| 5,696,560 A | 12/1997 | Songer |
| 5,905,530 A | 5/1999 | Yokota et al. |
| 5,909,312 A | 6/1999 | Mendlovic et al. |
| 5,940,217 A | 8/1999 | Broome et al. |
| 5,956,091 A | 9/1999 | Drewery et al. |
| 6,248,988 B1 | 6/2001 | Krantz |
| 6,738,057 B1 * | 5/2004 | Campbell ............... 345/611 |
| 6,844,990 B2 | 1/2005 | Artonne et al. |
| 6,867,933 B2 | 3/2005 | Matsusaka |
| 6,873,358 B1 * | 3/2005 | Shimizu ............... 348/240.99 |
| 7,098,949 B2 * | 8/2006 | Stavely ............... 348/240.2 |
| 7,227,984 B2 | 6/2007 | Cavan |
| 7,362,512 B2 * | 4/2008 | Nurishi ............... 359/697 |
| 7,627,193 B2 | 12/2009 | Alon et al. |
| 2005/0276475 A1 | 12/2005 | Sawada |
| 2006/0028564 A1 | 2/2006 | Baer |

FOREIGN PATENT DOCUMENTS

| | | |
|---|---|---|
| JP | 4-011467 A | 1/1992 |
| JP | 5-176212 A | 7/1993 |
| JP | 7-067025 A | 3/1995 |
| JP | 8-234275 | 9/1996 |
| JP | 8-307753 | 11/1996 |
| JP | 10-233950 A | 9/1998 |
| JP | 2004-064795 A | 2/2004 |
| JP | 2004-264287 A | 9/2004 |
| JP | 2005-010521 A | 1/2005 |
| WO | WO-2004/063989 A | 7/2004 |

\* cited by examiner

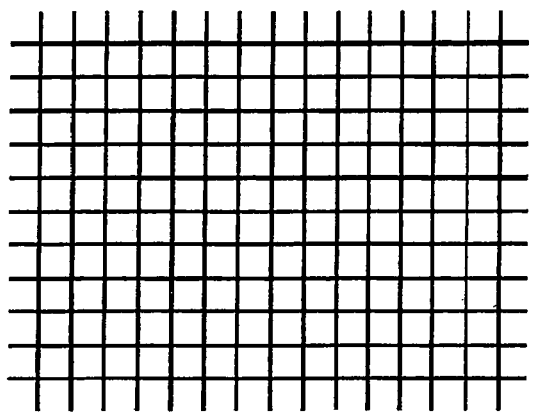
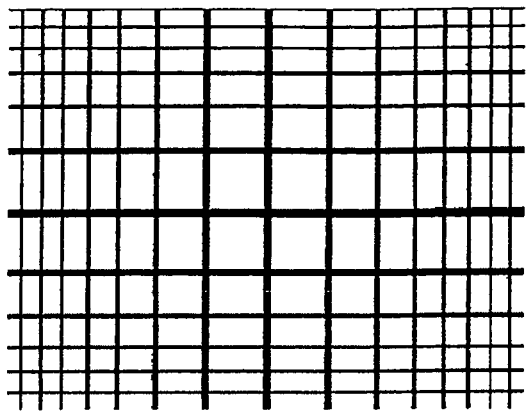
Fig. 2a        Fig. 2b
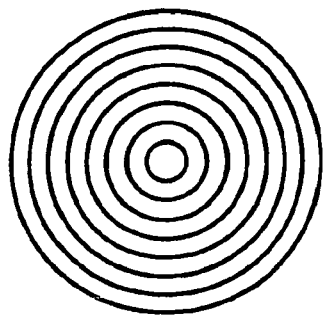
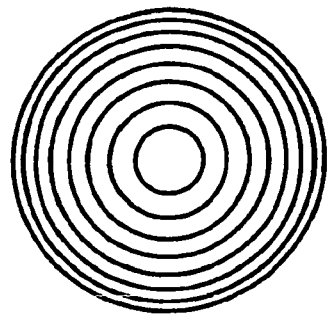
Fig. 3a        Fig. 3b

IMAGE CAPTURING DEVICE WITH IMPROVED IMAGE QUALITY

The present invention relates to an image capturing device and particularly to an image capturing device with improved image quality for electronic devices.

BACKGROUND OF THE INVENTION

Recently, image capturing devices have become widely used in portable and non-portable devices such as cameras, mobile phones, webcams and notebooks. These image capturing devices conventionally include an electronic image detector such as a CCD or CMOS sensor, a lens system for projecting an object in a field of view onto the detector and an electronic circuitry for receiving and storing electronic data provided by the detector.

Resolution and optical zoom are two important performance parameters of such image capturing devices.

Resolution of an image capturing device means the minimum distance two point sources in an object plane can have such that the image capturing device is able to distinguish these point sources. The resolution depends on the fact that due to diffraction and aberrations each optical system projects a point source not as a point but as a disc of predetermined width and having a certain light intensity distribution. The response of an optical system to a point light source is known as point spread function (PSF).

The overall resolution of an image capturing device mainly depends on the smaller one of two components: the optical resolution of the optical projection system and the resolution of the detector.

Herein, the optical resolution of an optical projection system shall be defined as the full width at half maximum (FWHM) of its PSF. In other words, the peak values of the light intensity distribution of a projection of two point light sources must be spaced at least by the FWHM of the PSF in order for the image capturing device to be able to distinguish the two point light sources. However, the resolution could also be defined as a different value depending on the PSF, e.g. 70% of the width at half maximum. This definition of the optical resolution might depend on the sensitivity of the detector and the evaluation of the signals received from the detector.

The resolution of the detector is defined herein as the pitch (i.e. distance middle to middle) of two adjacent sensor pixels of the detector.

Optical zoom signifies the capability of the image capturing device to capture a part of the field of view of an original image with better resolution compared with a non-zoomed image. Herein, it is assumed that in conventional image capturing devices the overall resolution is usually limited by the resolution of the detector, i.e. that the FWHM of the PSF can be smaller than the distance between two neighboring sensor pixels. Accordingly, the resolution of the image capturing device can be increased by selecting a partial field of view and increasing the magnification of the optical projection system for this partial field of view.

E.g., ×2 optical zoom refers to a situation where all sensor pixels of the image detector capture half of the image, in each dimension, compared with that of ×1 optical zoom.

The difference between "optical zoom" and "digital zoom" in this document is that applying "digital zoom" merely corresponds to signal interpolation where no additional information is actually provided. "Optical zoom" for that matter includes a magnification of the projected partial image and provides more information and better resolution.

Prior art in realizing optical zoom consists of either changing the distance between the lenses and/or changing the focal length of some of the lenses in a lens module.

One conventional way for obtaining optical zoom is through a mechanical apparatus which effectively changes the magnification of the optical system. This can be achieved by changing the distance of lenses of the optical projection system by mechanically displacing one or more of the lenses while controlling the location of the image plane. However, such conventional image capturing systems require a complex mechanical system including several lenses and a control to drive this lens system. The mechanical system is large, heavy, subject to mechanical failure and expensive.

Alternatively, other prior art techniques for obtaining optical zoom are based on variable focal length lenses. In such embodiments, individual lenses in a lens system are capable of changing their focal length in the presence of an electric field or mechanical pressure. These lenses are typically filled with fluid of one or more types and are capable to change their shape and therefore the lens' focal length. Such solutions typically result in poor image quality in comparison with fixed focal length systems. Moreover, they are often prone to fatigue and aging effects.

The mentioned optical systems typically require moving parts and/or special drivers with possibly high-voltage circuitry and do not result in a cost-effective solution.

It is therefore an object of the present invention to provide an image capturing device having an improved image quality which is adapted to prevent the above drawbacks.

Particularly, it is an object to provide an image capturing device having small size, no or few moving parts and being able to provide increased resolution compared to conventional image capturing devices having the same field of view.

SUMMARY OF THE INVENTION

The present invention is based on the finding that in simple triplet like imagers as they are conventionally used as image capturing devices for e.g. mobile phones, the PSF is a function of the angle of incidence. This brings up the effect of a non-uniform resolution across a captured image. I.e., the maximum attainable resolution is a function of the location at the image plane. This effect is on-top of any other effect that limits the spatial resolution, such as e.g. defocus.

The detector's sensor pixels sample the image of an object projected onto the detecting surface of the detector to form digital image signals thereof. Typically, the pixel dimensions are comparable with the width of the point spread function of the optical projection system at the centre of the image. In conventional image capturing devices the PSF at the borders of the image is wider than the PSF at the centre of the image due to the above mentioned dependency of the resolution on the angle of incidence. Accordingly, there is commonly oversampling at the border region of the image in conventional devices. That means that e.g. two or more sensor pixels are provided in the area of the PSF of a single object point in the border region such that they do not provide distinguishable optical information. In other words, the sensor pixels sample the image signal at a higher rate than required by the sampling theorem.

According to a first aspect, the present invention provides an image capturing device, comprising: an electronic image detector having a detecting surface, an optical projection system for projecting an object within a field of view onto the detecting surface, and, optionally, a computing unit for manipulating electronic information obtained from the image detector, wherein, the projection system is adapted to project the object in a distorted way such that the projected image is expanded in the center region of the field of view and is compressed in the border region of the field of view.

The electronic image detector can be any detector being able to convert optical information projected onto its detecting surface into electrical signals. Examples are CCD or CMOS detectors. The detector can have one or more output lines to provide the electrical signals sequentially or parallely to the computing unit for processing the signals or to a memory for storing the signals.

The computing unit can be any electronic circuitry. E.g. it can be an integrated chip device. As described herein later in more detail, the computing unit can be adapted to process the signals received by the detector in order to obtain an undistorted image of high quality or to provide a zoomed partial image.

The optical projection system includes one or more optical elements like e.g. optical lenses or reflecting surfaces of mirrors or prisms or the like. The optical elements are arranged such that a predetermined field of view including the object can be projected onto the detecting surface of the image detector.

It is to be noted that the optical projection system can have a fixed focus. This means that its optical magnification can not be changed by external manipulation. Especially, there need not to be moving parts provided in the optical projection system for adapting the focus. Generally, there is nothing dynamic in the system (i.e., no change in time), but the effective focal length (EFL), which determines the magnification, changes as a function of the location across the sensor plane. The EFL is large at the center and small at the borders. The magnification changes across the image and causes the distortion.

The image capturing system of the present invention differs from prior art systems in that its projection system is adapted to project the object to be imaged in a distorted way. The center of the field of view is expanded or stretched whereas the border region closer to the circumference of the field of view is compressed. In other words, the projection system projects the object with a greater magnification at the center of the field of view and with a smaller magnification at the border of the field of view. As a result, the image projected onto the detecting surface is distorted. This is in contrast to conventional systems which usually aim for undistorted projection in order to avoid post-processing.

It is to be noted that the conventional projection system and the projection system according to the present invention can both have the same field of view. The projection system according to the present invention differs mainly in that it provides a non-homogeneous magnification across the field of view wherein, compared to a conventional system, the center has a higher magnification and the border region has a lower magnification.

In this context it benefits from the fact that in a conventional image capturing system there is oversampling in the border region of the field of view. By choosing a smaller magnification in this region, the area of the PSF on the detecting surface can be reduced. No information contained in the projected image is lost as long as the FWHM of the PSF is larger than the size of the sensor pixels.

On the other hand, by choosing a higher magnification in the center of the field of view the overall resolution in this region can be enhanced. This is due to the fact that, in conventional image capturing devices, at the center of the field of view, the area of the PSF on the detecting surface is smaller than the sensor pixel size which therefore limits the overall resolution.

Hence, when the magnification is changed at the center by increasing the focal length, the F-number is increased. This implies that the maximal limit of resolution is decreased. However, since the F-number is larger, there are less aberrations and the optical resolution remains approximately the same.

In other words, the PSF of two neighboring points in the object plane can be narrow enough so that they are separated by a FWHM, and are therefore optically distinguishable, but the two points are projected onto the same pixel of the detector such that their optical information cannot be separated electronically. By increasing the magnification, the area of the PSF on the detecting surface and the distance between two PSFs of neighboring points are increased. The above two neighboring points are then projected onto different sensor pixels and additional information on the projected image can be retrieved by the sensor pixels. However, if the magnification in the center is increased more than a predetermined limit at which the area (FWHM) of the PSF becomes larger than the pixel size, oversampling occurs and further increasing the magnification does not provide more information.

Accordingly, the image capturing device of the present invention can provide a distorted image having a higher resolution at the center while the overall resolution of the device is not decreased in any part of the field of view when compared to a conventional image capturing device having the same field of view. As a result, the image is projected in a distorted way such that the resolution of the image detector is used more economically.

According to one embodiment of the present invention the projection system is adapted such that its point spread function in the border region of the field of view has a full width at half maximum being less than three times, preferably less than twice the size of pixels in the corresponding region of the image detector. Preferably, the local magnification of the projection system is chosen such that the FWHM of the PSF in the border region corresponds to the size of corresponding pixels of the image detector. That means that the size S of the sensor pixels is essentially the same as the FWHM, e.g. FWHM<2*S, preferably FWHM<1,5*S or more preferred 0,8*S<FWHM<1,2*S and most preferred FWHM=S.

Incidentally, the "size of a pixel" can be defined as the distance between two neighboring pixels, from middle to middle. Therein, a pixel is the smallest unit adapted to receive information about a minimum area in the object plane. In case of a monochrome detector, each pixel detects information about the light intensity of such minimum area. In a color detector, a pixel can be composed of several subpixels, e.g. three or more pixels, each being adapted to detect information about the light intensity in a specific color range of such minimum area, e.g. for the red, green and blue spectral range, respectively. For example, a pixel can be composed of four subpixels arranged in a rectangle wherein in a first row there is a subpixel sensitive to a red light spectrum neighboring a subpixel sensitive to a green light spectrum and in the second row there is a subpixel sensitive to a green light spectrum neighboring a subpixel sensitive to a blue light spectrum. Accordingly, one pixel contains four subpixels. Another example is where the different columns of the detector are sensitive to different colors, e.g., one column is sensitive to red another column is sensitive to green and another column is sensitive to blue and vice versa. In this case a pixel is composed of three subpixels, each sensitive to a different color.

In a further embodiment of the present invention, the projection system is adapted to magnify the center region of the projected image such that the optical magnification of the projected image in the center region of the field of view is more than two times, preferably more than three times, and more preferably more than four times the optical magnification of the projected image in the border region of the field of view. In fact, the difference of magnification between the border region and the center of the field of view can be up to six times and depends mainly on the difference between the PSFs in the two regions of a non-distorting projection system having the same field of view (or the willingness to lose some information at the borders). In other words, the greater the oversampling in the border region of the field of view in a corresponding non-distorting system, the bigger the difference in magnification between center and border can be.

In a further embodiment of the present invention, the projection system is adapted such that a local magnification of any partial area of the field of view is selected such that the PSF in such partial area has a FWHM essentially corresponding to the size of corresponding pixels of the image detector onto which the partial area is projected. In an image capturing system having such projection system the optical resolution is adapted in an optimum way to the resolution of the detector.

In a further embodiment of the present invention, the computing unit is adapted to compute an undistorted picture of the projected object from data received from the image detector. The image detector generates data corresponding to the distorted projection of the object to be captured. These data are provided to the computing unit. This unit has been programmed, in software or in hardware, to calculate the undistorted image from the distorted image data. For this purpose, the precise way of distortion generated by the projection system must be known, estimated or measured.

For example, starting with distorted image data, undistorted pixels of an output image can be produced e.g. in raster order. Each pixel has a certain magnification value that is a-priori known and is used to determine its value from the distorted image. The magnification values for each pixel can for example be calculated using an algorithm for reversing the distortion. Or the values can be determined in advance experimentally, e.g. by using a test picture and comparing the original with the distorted projection of the picture, and can then be stored as look-up table in a memory of which the values are retrieved when calculating the undistorted images.

Signal interpolation can be used to improve the quality of the distortion-corrected image. For example, as the centre of a pixel in a distorted image may not precisely correspond to the centre of a corresponding undistorted pixel, values of neighboring pixels can be used to calculate an interpolated pixel value. The type of interpolation can be bilinear or cubic or any other type.

In a further embodiment of the present invention, the image detector has pixels including different types of subpixels each type being sensitive to a predetermined range of colors to detect different color components of the projected image, respectively. Therein, the computing unit is adapted to compute data from different types of subpixels differently. In other words, the detector is a color detector wherein each pixel comprises subpixels sensitive to a different color. For example, an R-subpixel sensitive to red, a B-subpixel sensitive to blue and a G-subpixel sensitive to green are provided. For such color detector, it is convenient to calculate the undistorted image by taking into account that the distortion of the projection system is usually different for different colors, an effect which is commonly known to generate so called chromatic aberrations.

Therefore, in one further embodiment of the present invention, the computing unit is adapted to correct image errors due to chromatic aberrations.

According to a further embodiment of the present invention, the optical projection system is adapted for projecting in a distorted way such that the distortion of the projected image is separable in a x-direction and in a y-direction perpendicular to the x-direction. Accordingly, the computing unit can include a transformation algorithm for computationally correcting the distortion of the detected image separably in a x-direction and in a y-direction perpendicular to the x-direction. Such separable transformation can simplify and accelerate the process of correcting the distortion in the captured image.

According to a further embodiment of the present invention, while computing an undistorted image, the computing unit includes an algorithm to computationally compress data corresponding to the center region of the projected image and not to compress data corresponding to the border region of the projected image. In other words, while computationally reversing the distortion of the projected image, it is taken into account that the border region of the projected area has already been more compressed optically by the projection system than the center region, which was magnified. Accordingly, in order to obtain an undistorted image having the same magnification across the entire image area, it is sufficient to computationally compress the center region to a degree to which the border has already been compressed optically.

According to a further embodiment of the present invention, the computing unit is adapted to crop and compute a zoomed, undistorted partial image from the center region of the projected image. For this purpose, it takes advantage of the fact that the projected image acquired by the detector has a higher resolution at its center than at its border region. For normal pictures of the entire field of view, the center region is compressed computationally. However, if a zoomed partial image of a part of the image close to the center is to be taken, this can be done by simply cropping the partial image and compressing it less or not compressing it at all depending on the desired zoom and the degree of distortion of the partial image. In other words, with respect to a non-zoomed image, the image is expanded and cropped so that all pixel information will be used to describe the zoomed image.

Hence, a great advantage of the image capturing device of the present invention is that zoomed partial images at the center of the projected object can be obtained without losing resolution. In contrast to conventional fixed focus devices, the zoomed image is not generated by expanding the original image by computational interpolation known as "digital zoom". Instead, the original distorted image is simply compressed less while computationally correcting its distortion. Therefore, no virtual image information is produced by interpolation but real information "hidden" in the high resolution distorted image is used for generating the zoomed partial picture.

According to a further embodiment of the present invention, the computing unit is adapted to perform the manipulation of electronic information obtained from the image detector separately for separate information packages each package corresponding to a portion of the projected image. In other words, the information provided by the image detector is divided into several packages. The computing unit then does not manipulate the entire information provided by the image detector in one single step but manipulates one package after the other. Between the manipulation of two packages there can be an interruption which can e.g. be used for storing the data corresponding to the package of information of the undistorted picture obtained in the previous manipulation. Using such "pipeline processing" can make the process of manipulating and storing the data of the undistorted image more flexible.

According to a further embodiment of the present invention, the optical projection system includes at least one lens formed by injection molding. Such a lens consisting e.g. of a resin material is much cheaper than lenses made of polished glass. However, such a low cost lens normally provides images of reduced quality due to aberrations and/or lens error resulting from production tolerances. In the image capturing device of the present invention, the reduced image quality can be corrected using the computing unit. The image errors generated by the low cost lens are known a priori e.g. by measuring or by computational simulation. As the projected image is manipulated anyway by the computing unit while correcting its distortion, these image errors can be accounted for in the same processing step without causing additional complexity or costs. I.e. image quality loss due to the low cost lens can be compensated with the image capturing device's computing unit.

According to a further embodiment of the present invention, the pixels of the image detector have uniform size over the entire detector surface. Therefore, conventional image detectors can be used. For example, for obtaining improved resolution and zoom capability, an existing image capturing system can simply be retrofitted by an adapted projection system and a computing unit according to the present invention wherein the detector need not be replaced. Accordingly, costs can be saved when retrofitting or replacing an existing image capturing device as a standard detector can be used for embodying the present invention.

According to a further embodiment, an image capturing device of the present invention has a volume of less than 500 mm$^3$, preferably less than 200 mm$^3$ and more preferably less than 100 mm$^3$. Having such small volume, it can be easily incorporated in portable devices such as mobile phones, digital cameras or laptops.

According to a further embodiment of the present invention, the optical projection system comprises less than four lenses, preferably less than three lenses and more preferably only one lens. Although a reduced number of lenses induces more aberration, these aberrations can be accounted for while computationally processing the electronic image data.

According to a further embodiment of the present invention, the optical projection system has a fixed focal length. That means that there are no moving parts included. Accordingly, the costs of the projection system are reduced and the risk of failure of a mechanical moving mechanism is eliminated.

According to a further embodiment of the present invention, the image capturing system further includes a storing unit wherein electronic information obtained from the image detector corresponding to the projected distorted image is stored in the storing unit. By storing the information corresponding to the projected distorted image the information can be protected against unauthorized access to a certain degree. The information cannot be accessed without knowing the algorithm for computing the undistorted picture. Therefore, an unauthorized person reading the "encrypted" information cannot easily print or view the images.

For example in a single use camera the information can be stored in the "encrypted" format. Such single use camera normally does not include its own computing unit. Instead, the stored information is processed externally in order to reproduce the undistorted images. Such processing can only be performed by a person knowing the "key", i.e. the algorithm for reversing the distortion introduced by the image projection system.

According to a further embodiment of the present invention, the optical projection system is adapted for projecting an object within a field of view with a distortion of radial symmetry onto the detecting surface.

According to a further embodiment of the present invention, the optical projection system is adapted such that the field of view projected onto the detecting surface of the detector and the detecting surface of the detector have the same shape. For example, if the detector has a rectangular detecting surface with a given aspect ratio (height/width), than the field of view projected onto the detecting surface preferably is rectangular as well having the same aspect ratio.

Alternatively, the optical projection system can be adapted for projecting an object within a field of view with a distortion such that the geometry of the projected image corresponds to the geometry of the electronic image detector. E.g. in case of an image detector of a rectangular shape the optical projection system can be adapted to distort the projected image in such a way that it matches the shape of the detector. In such case, the field of view of the image capturing system can preferably have a rectangular geometry but it is also possible to have a field of view of any other geometry.

According to further aspects of the present invention, there is provided a portable electronic device such as a mobile phone, a webcam or a portable computer including an image capturing device as described herein before. In such applications, the computing unit of the inventive image capturing device can be implemented into the processor provided in such portable devices. Alternatively, it can be embedded into a microchip including the sensor of the image capturing device.

BRIEF DESCRIPTION OF THE DRAWINGS

Further details and advantages of the present invention will appear to those skilled in the art from the following description of preferred embodiments thereof in conjunction with the appended drawings, wherein:

FIGS. 2a and 2b show an example of a rectangular distortion pattern that is separable in X & Y coordinates and can be used in an embodiment of the present invention;

FIGS. 3a and 3b show an example of a distortion pattern with circular symmetry that can be used in an embodiment of the present invention;

DESCRIPTION OF PREFERRED EMBODIMENTS

Figure 1:
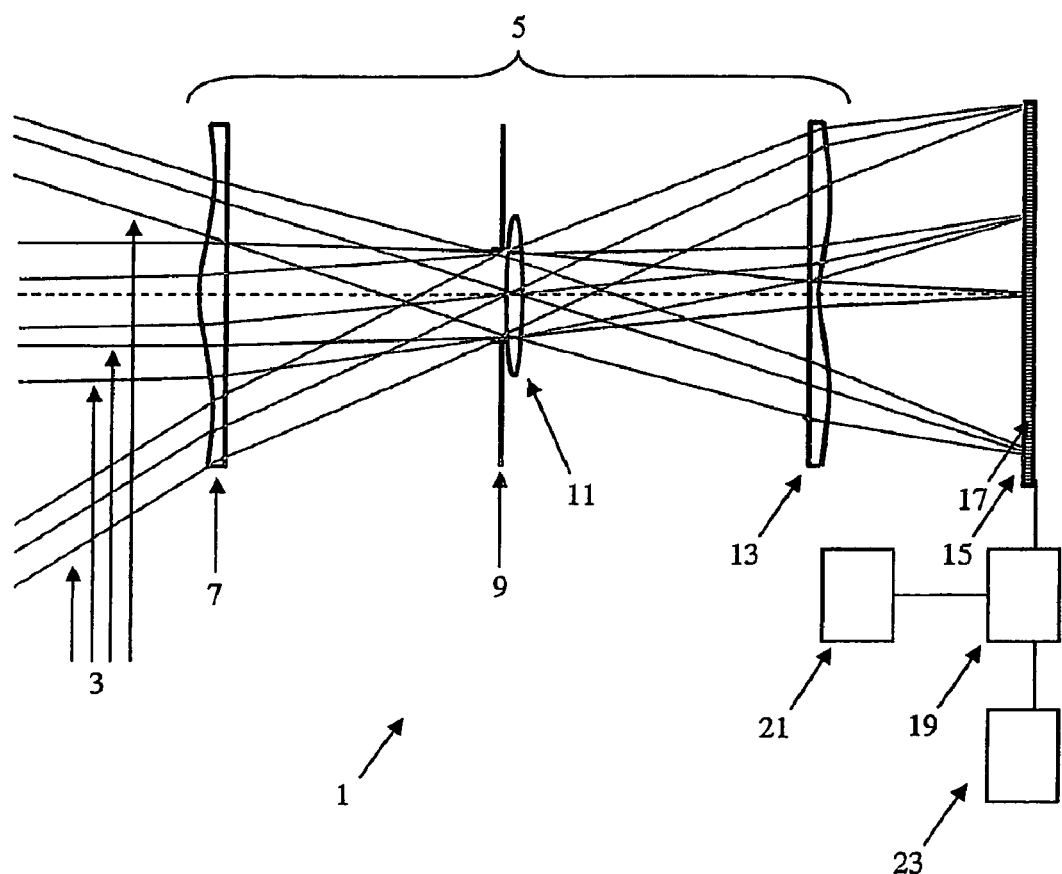
FIG. 1 schematically shows an embodiment of an image capturing device according to the present invention.

In FIG. 1, a schematic example of an image capturing device 1 of the present invention is shown wherein light rays 3 coming from an object to be projected (on the left side in figure, not shown) pass through an optical projection system 5 comprising a first lens 7, an aperture 9, a second lens 11 behind the aperture 9 and a third lens 13. Finally, the light rays 3 impinge onto the detecting surface 15 of a CCD or CMOS image detector 17.

The lenses 7, 11, 13 of the projection system 5 have surface geometries that are designed such that, while being projected onto the detector, the image of the object is distorted such that its center region is expanded whereas its border region is compressed, when compared to a non-distorted projected image of the same field of view. The lenses 7, 11, 13 are designed such that for small angles of incidence the structure of the three lenses resembles a telephoto design, i.e., effective focal length that is greater than the physical length of the lens module. For large angles of incidence, the lenses are designed to resemble a retro-photo system, i.e., the effective focal length is smaller than the physical length of the lens module.

The light of the object projected onto the detecting surface 15 is then captured by sensor pixels of the detector 17 and is transformed into electrical signals. These signals are transmitted to a computing unit 19. The computing unit 19 is connected with a memory 21 and a display unit 23.

The signals coming from the detector 17 can be stored in the memory 21 and/or they can be directly displayed on the display unit 23. E.g. in video applications, the signals are normally both stored in a memory and displayed on a screen in real time. In the case where the data are to be stored, the processing of the data may be performed before or after storing the data and the stored data correspond to either the distorted image captured by the detector or the processed undistorted image. Processing the signals can be performed by software or by dedicated hardware or off camera, e.g., for single use or multi use digital cameras. The signal processing can be performed using pipelined architectures or without using pipelined architectures.

When a picture of the stored image is to be displayed at a later stage of time, the image data can be read from the memory. Before displaying the picture of the captured object, the image data have to be computed by the computing unit in order to reverse the distortion introduced by the projection system. Different signal processing schemes may be applied to different displays depending on the resolution of the display, which may not match the resolution of the detector.

It is to be noted that one skilled in the art a priori knowing the distortion effected by the projection system will be able to program the computing unit in such a way to be able to calculate the undistorted image.

FIG. 2a shows a rectangular pattern. In FIG. 2b, a representation of the pattern of FIG. 2a is shown as it is projected by the optical projection system of an embodiment of the present invention. The projection is distorted such that the pattern is expanded in a center region and compressed in a border region. In this specific example the transformation representing the distortion is separable in the horizontal and vertical axes.

FIG. 3a shows a pattern of circular symmetry having equidistant rings. In FIG. 3b, a representation of the pattern of FIG. 3a is shown as it is projected by the optical projection system of an embodiment of the present invention. The projection is distorted such that the pattern is expanded in a center region and compressed in a border region.

Figure 4A:
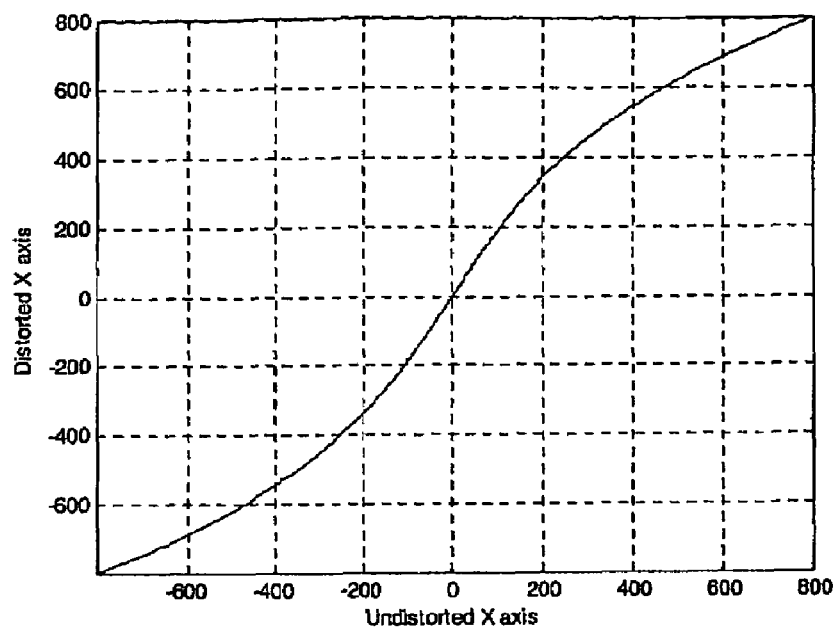
FIGS. 4a and 4b show curves of a separable X-Y-transformation similar to the one presented in FIG. 2b, which can be used for designing the optical projection system and for programming the computing unit of the image capturing device according to an embodiment of the present invention.
Figure 4B:
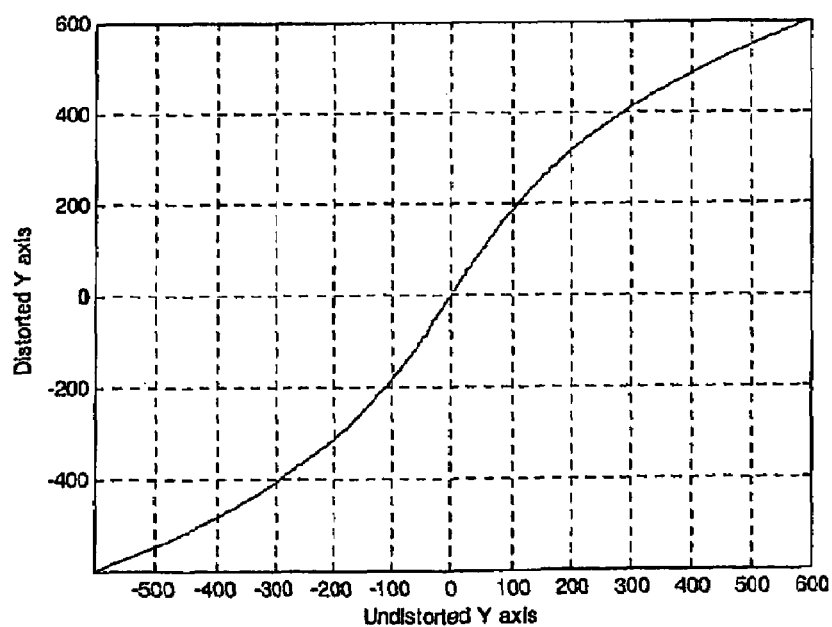

FIGS. 4a and 4b show exemplary transformation functions of a separable transformation similar to the one used in FIG. 2b, which can be used for computing an undistorted image from the signals provided by the image sensor. When the projection distortion function provided by the optical projection system is known, by simulation or by measuring, such transformation functions can be derived as an inverse of the projection distortion function, e.g. by a polynomial approximation. Accordingly, from the position $x_d$ of a pixel in the projected distorted image, the position $x_{nd}$ of this pixel in a non-distorted image can be calculated using the transfer function shown in FIG. 3a. The same applies for the y-coordinate wherein the transfer function of FIG. 3b can be used.

Using a separable transformation is therefore advantageous for implementing one-dimensional operators for performing the required processing, for storing the transformation function in a small one-dimensional array and for fast processing algorithms. An X-Y separable coordinate distortion is of further advantage since it transforms a rectangular detecting array that captures a distorted image to a rectangular non-distorting image after applying the required processing for correcting the distorting image.

Alternatively, when using an optical projection system with radial symmetric distortion (as shown e.g. in FIG. 3b) a transfer function can be used which depends only on the radial distance of a pixel from the center. Therein, polar coordinates can be used for calculating the coordinates of the non-distorted image.

Figure 5:
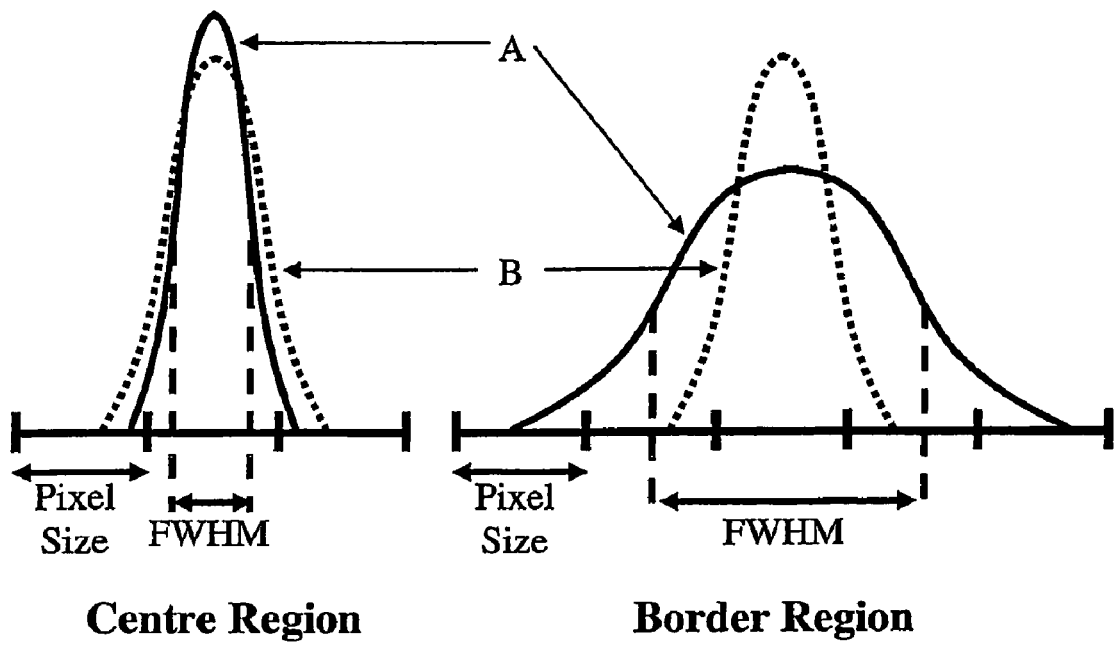
FIG. 5 shows a schematic illustration representing the PSF at a border region and at the centre of the image for a conventional image capturing system and an image capturing system according to an embodiment of the invention.

FIG. 5 shows a schematic illustration representing the PSF at a border region and at the centre of the image for a conventional image capturing system (full line A) and an image capturing system according to an embodiment of the invention (broken line B). On the x-axis the size of the pixels is represented schematically.

It can be seen that in the conventional system, the FWHM of the PSF is larger than the pixel size and oversampling occurs in the border region. In the center, the FWHM of the PSF is smaller than the pixel size such that optical information is wasted. In contrast hereto, the FWHM of the PSF for an image capturing system according to an embodiment of the invention can be comparable to the size of the pixels both in the center and in the border region. In the optimum case, no oversampling occurs and no optical information is wasted.

Summarizing, with respect to the present invention, the following is to be noted: In general, the optical geometrical distortion matches the optical resolution (limited by the characteristics of the optics and the aberrations employed with it) to the digital resolution introduced by the pixels of the digital detector array. The geometrical distortion is chosen in accordance with the desired maximum zoom value. Nonetheless, since the image is stretched at the centre of the image, it must be shrink at the borders to maintain the same field of view. This shrinking effect can be implemented such that the image quality at the borders will be comparable to that of a standard image capturing device. This is possible due to the dependence of spatial resolution on the location in the image.

Figure 6:
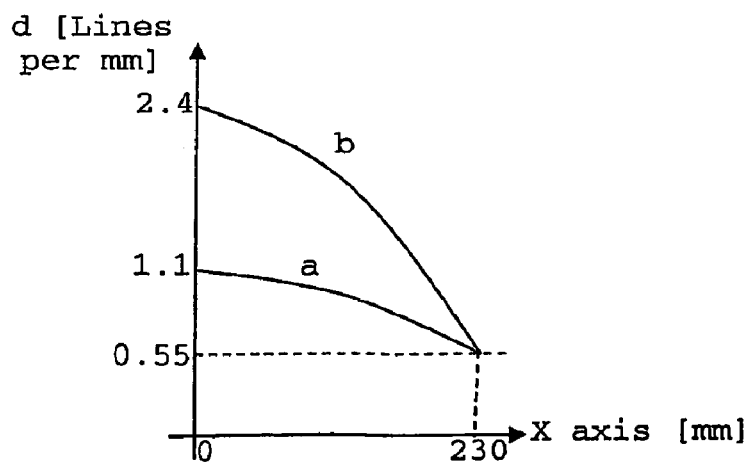
FIG. 6 shows a graph illustrating the inverse effective resolution versus the distance from the center of the object being captured for a conventional image capturing system compared with an image capturing system according to the present invention.

FIG. 6 presents schematically this phenomenon in an exemplary embodiment of the present invention: The y-axis shows the inverse "d" (in units of lines per mm) of the effective resolution of a standard (solid line a) and of a capturing device according to the invention (solid line b), i.e., of the minimal distance between two point sources, at which two point sources can be distinguished (rather than being seen as a single point source). The x-axis represents the distance at the object plane from the centre of the object to a point on the object plane. In this example, the effective focal length of the standard device is assumed to be 4 mm, the F-number (F/#) is assumed to be 3, the field of view of the lens module is approximately +/−30° and the distance of the object from the lens module is assumed to be 400 mm. The resolution curve shows the resolution at the object plane (i.e., 400 mm away from the lens module). For example, in a 2M pixel image capturing device one can assign values to the y-axis taking into account the following assumptions:

1. The diffraction limit is approximately 1.5 μm (lambda X F/#);
2. The FWHM of the PSF (at the sensor plane) of a standard mass-produced triplet image capturing device can reach approximately 33% of the diffraction limit at the central part of the image, i.e., approximately 4.5 μm;
3. There is another approximately 50% resolution degradation at the edges of the image, meaning that the resolution at the edges (at the sensor plane) is approximately 9.0 μm.

This means that whenever pixels are smaller than 9.0 μm there is over-sampling at the edges of the image when a standard image capturing device is employed. Furthermore, whenever pixels are larger than 4.5 μm the CMOS sensor of a standard imager does not capture the entire image information at the image centre. For this reason, it is still preferable to use, for example, a 4.5 μm CMOS sensor (or 2.2 μm pixels that detects different colors).

Under these conditions, the effective inverse resolution d in units of lines per mm (measured at the object plane) of a standard imager (solid line a) and of the proposed imager according to the present invention (solid line b) is given in FIG. 6. Therein the x-axis represents the distance x from the centre of the object to another point on the object, wherein for x=230 mm the viewing angle is approximately 30°, which corresponds to the object's borders. It can be seen that in this embodiment the resolution of the inventive image capturing device is approximately double that of the conventional image capturing device at the centre of the image and equal to the resolution of the conventional device at its borders.

It is important to note that solid line b in FIG. 6 takes into account the nonlinear magnification curve of the proposed optical system and therefore provides high resolution at its centre. The width of the PSF of this embodiment is fairly constant across the entire capturing device and it equal to 4.5 μm. This allows utilizing the sensor pixels more efficiently. The different magnification values result in different resolution values across the object.

It is to be noted that in the forgoing description the different magnification, resolution and the like have always been mentioned with respect to the border region or to the centre region of the projecting surface. However, as one skilled in the art will easily recognize, there is no abrupt transition between these two regions but the mentioned parameters change continuously from the border to the centre.

Figure 7:
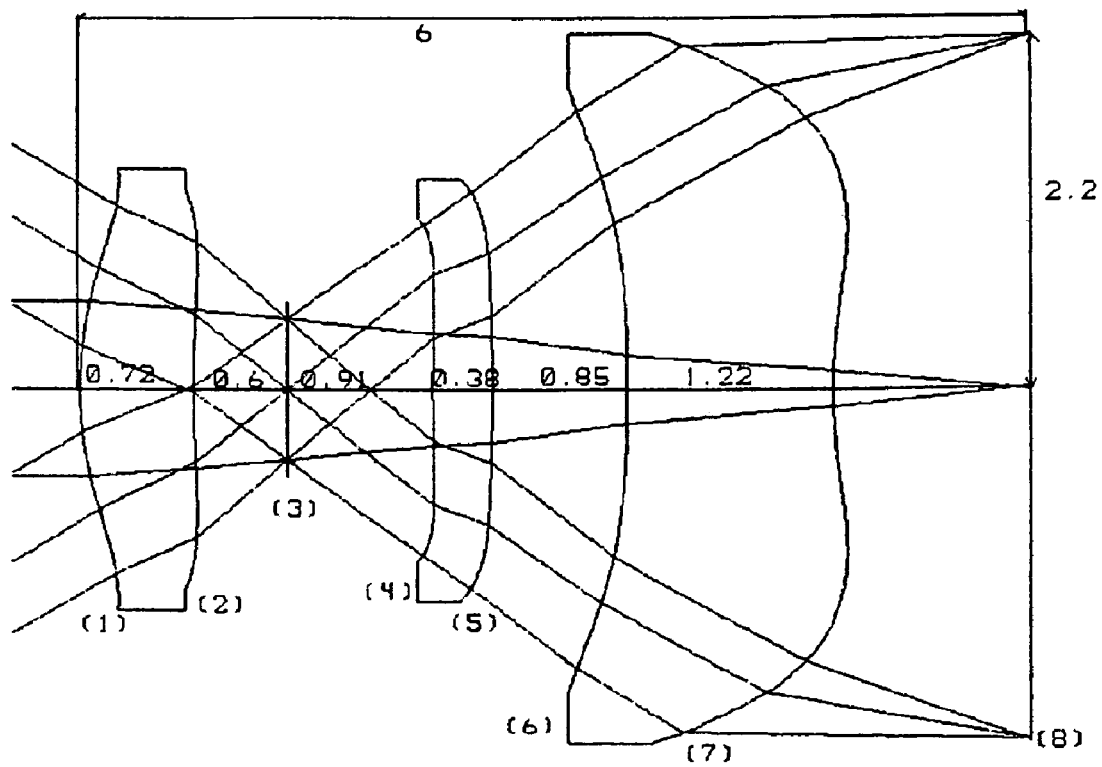
FIG. 7 shows an exemplary optical design of the present invention that provides image expansion at the center and image compression at the borders when compared with a standard imager.

In FIG. 7 an exemplary optical design according to the invention that results in a radial distortion, which provides image expansion in the center and image compression at the borders for a standard field of view of +/−30° is provided. The spherical and ashperical coefficients and the apertures of all optical surfaces along with the materials from which the lenses are made are provided as follows:

| SURFACE DATA | | | | | | |
|---|---|---|---|---|---|---|
| SURF | RADIUS | THICKNESS | MEDIUM | INDEX | V-NUMBER | |
| 0 | INFINITE | INFINITE | AIR | | | |
| 1 | 2.18431 ◯ | 0.72193 | BK10 | 1.49782 | 66.95 | SCHOTT |
| 2 | −13.45090 ◯ | 0.60470 | AIR | | | |
| APS | INFINITE | 0.90947 | AIR | | | |
| 4 | −2.51855 ◯ | 0.37974 | GLM-NdVd | 1.82364S | 23.16 | |
| 5 | −5.69831 ◯ | 0.85729 | AIR | | | |
| 6 | 4.07431 ◯ | 1.30406 | PICKUP | 1.49782P | 66.95 | |
| 7 | 3.27945 ◯ | 1.22632 | AIR | | | |
| 8 | INFINITE | 0.00000 | AIR | | | |
| IMG | INFINITE | | | | | |

| SPECIAL SURFACE DATA | | | | | |
|---|---|---|---|---|---|
| SURFACE NO. 1 -- CONIC + POWER-SERIES ASPHERE | | | | | |
| G1 | 0.012681($R^{}2$) | G3 | −0.011721($R^{}4$) | G6 | −0.020081($R^{**}6$) |
| G10 | 1.000000E−11($R^{**}8$) | | | | |
| CONIC CONSTANT (CC) | −1.692041 | | | | |
| SEMI-MAJOR AXIS (b) | −3.156326 | SEMI-MINOR AXIS (a) | −2.625717 | | |
| SURFACE NO. 2 -- CONIC + POWER-SERIES ASPHERE | | | | | |
| G1 | 0.125679($R^{}2$) | G3 | −0.070979($R^{}4$) | G6 | 0.001758($R^{**}6$) |
| G10 | 1.000000E−11($R^{**}8$) | | | | |
| CONIC CONSTANT (CC) | 51.703471 | | | | |
| SEMI-MAJOR AXIS (b) | −0.255218 | SEMI-MINOR AXIS (a) | 1.852814 | | |
| SURFACE NO. 4 -- CONIC + POWER-SERIES ASPHERE | | | | | |
| G1 | 0.214030($R^{}2$) | G3 | 0.071936($R^{}4$) | G6 | −0.052975($R^{**}6$) |
| G10 | 1.000000E−11($R^{**}8$) | | | | |
| CONIC CONSTANT (CC) | 4.121475 | | | | |
| SEMI-MAJOR AXIS (b) | −0.491762 | SEMI-MINOR AXIS (a) | 1.112892 | | |

-continued

SPECIAL SURFACE DATA

SURFACE NO. 5 -- CONIC + POWER-SERIES ASPHERE

| G1 | 0.037959($R^{}2$) | G3 | 0.057576($R^{}4$) | G6 | −0.043016($R^{**}6$) |
|---|---|---|---|---|---|
| G10 | 1.000000E−11($R^{**}8$) | | | | |
| CONIC CONSTANT (CC) | | 14.212248 | | | |
| SEMI-MAJOR AXIS (b) | | −0.374587 | SEMI-MINOR AXIS (a) | | 1.460996 |

SURFACE NO. 6 -- CONIC + POWER-SERIES ASPHERE

| G1 | −0.172504($R^{}2$) | G3 | −0.036871($R^{}4$) | G6 | 0.005550($R^{**}6$) |
|---|---|---|---|---|---|
| G10 | 1.000000E−11($R^{**}8$) | | | | |
| CONIC CONSTANT (CC) | | −0.092289 | | | |
| SEMI-MAJOR AXIS (b) | | 4.488549 | SEMI-MINOR AXIS (a) | | 4.276415 |

SURFACE NO. 7 -- CONIC + POWER-SERIES ASPHERE

| G1 | 0.040726($R^{}2$) | G3 | −0.048180($R^{}4$) | G6 | −0.004017($R^{**}6$) |
|---|---|---|---|---|---|
| G10 | 1.000000E−11($R^{**}8$) | | | | |
| CONIC CONSTANT (CC) | | −37.594416 | | | |
| SEMI-MAJOR AXIS (b) | | −0.089616 | SEMI-MINOR AXIS (a) | | −0.542117 |

| SURF | R- Semi APERTURE |
|---|---|
| 1 | 1.3808 |
| 2 | 1.2536 |
| 3 | 0.5500 |
| 4 | 1.0715 |
| 5 | 1.3162 |
| 6 | 1.8825 |
| 7 | 2.2152 |
| 8 | 2.2005 |
| 9 | 2.2005 |

The foregoing description is only exemplary and shall not restrict the scope of the present invention as it is defined in the appended claims. Furthermore, the full disclosure included in U.S. Pat. Nos. 5,909,312 and 6,343,307 B1 concerning inventions made in parts by the same inventors as the present application shall be incorporated herein by reference.

The invention claimed is:

1. Image capturing device, comprising:
an electronic image detector having a detecting surface, the detecting surface of the image detector includes pixels of predetermined size; and
an optical projection system for projecting an object within a field of view onto the detecting surface,
wherein the projection system is configured
to project the object in a distorted way such that the projected image is expanded in a center region of the field of view and is compressed in a border region of the field of view,
such that its point spread function in the border region of the field of view has a full width at half maximum greater than the size of corresponding pixels of the image detector and less than three times the size of corresponding pixels of the image detector, and
its point spread function in the center region of the field of view has a full width at half maximum of less than the size of corresponding pixels of the image detector.

2. Image capturing device according to claim 1, wherein the projection system is configured such that its point spread function in the border region of the field of view has a full width at half maximum corresponding to greater than 1 and up to 1.2 times the size of corresponding pixels of the image detector.

3. Image capturing device according to claim 1, wherein the projection system is configured to magnify the center region of the projected image such that an optical magnification of the projected image in the center region of the field of view is between two times six times an optical magnification of the projected image in the border region of the field of view.

4. Image capturing device according to claim 1, wherein the projection system is configured such that a local magnification of any partial area of the field of view is selected such that the point spread function in such partial area has a full width at half maximum corresponding to greater than 1 and up to 1.2 times corresponding to the size of corresponding pixels of the image detector onto which the partial area is projected.

5. Image capturing device according to one of claims 1, 2, 3, or 4, further comprising a computing unit for manipulating electronic information obtained from the image detector.

6. Image capturing device. according to claim 5, wherein the image detector has pixels including different types of subpixels each type being sensitive to a predetermined range of colors to detect different color components of the projected image, respectively, and wherein the computing unit is adapted to compute data from different types of subpixels differently.

7. Image capturing device according to claim 6, wherein the computing unit is configured to correct image errors due to chromatic aberrations.

8. Image capturing device according to claim 5, wherein the computing unit is configured to computationally correct distortion of the detected image introduced by the optical projection system.

9. Image capturing device according to claim 8, wherein the optical projection system is configured to project such that distortion of the projected image is separable in a x-direction and in a y-direction perpendicular to the x-direction.

10. Image capturing device according to claim 5, wherein the computing unit includes an algorithm to computationally compress data corresponding to the center region of the projected image and not to compress data corresponding to the border region of the projected image.

11. Image capturing device according to claim 5, wherein the computing unit is configured to crop and compute a zoomed, undistorted partial image from the center region of the projected image.

12. Image capturing device according to claim 5, wherein the computing unit is configured to perform the manipulation of electronic information obtained from the image detector separately for separate information packages each package corresponding to a portion of the projected image.

13. Image capturing device according to one of claims 1, 2, 3, or 4, wherein the optical projection system includes at least one lens made of plastic or glass formed by injection molding.

14. Image capturing device according to one of claims 1, 2, 3, or 4, wherein the pixels of the image detector have uniform size over an entirety of the detecting surface.

15. Image capturing device according to one of claims 1, 2, 3, or 4 having a volume of less than 500 mm$^3$.

16. Image capturing device according to one of claims 1, 2, 3, or 4, wherein the optical projection system consists of between one and three lenses.

17. Image capturing device according to one of claims 1, 2, 3, or 4, wherein the optical projection system has a fixed focal length.

18. Image capturing device according to one of claims 1, 2, 3, or 4, further including a storing unit wherein electronic information obtained from the image detector is stored in the storing unit.

19. Image capturing device according to one of claims 1, 2, 3, or 4, wherein the optical projection system is adapted for projecting an object within a field of view with a distortion of radial symmetry onto the detecting surface.

20. Image capturing device according to one of claims 1, 2, 3, or 4, wherein the optical projection system is adapted such that the field of view projected onto the detecting surface of the detector and the detecting surface of the detector have the same shape.

21. Mobile phone including an image capturing device according to one of claims 1, 2, 3, or 4 incorporated therein.

22. Portable computer including an image capturing device according to one of claims 1, 2, 3, or 4 incorporated therein.

23. Webcam including an image capturing device according to one of claims 1, 2, 3, or 4 incorporated therein.

* * * * *

UNITED STATES PATENT AND TRADEMARK OFFICE
CERTIFICATE OF CORRECTION

PATENT NO. : 8,233,073 B2  
APPLICATION NO. : 12/225591  
DATED : July 31, 2012  
INVENTOR(S) : Gal Shabtay et al.

Page 1 of 1

It is certified that error appears in the above-identified patent and that said Letters Patent is hereby corrected as shown below:

On the title page, item (73) should read:

-- (73) Assignee: DigitalOptics Corporation Europe Limited  
Ballybrit, Galway, Ireland Signed and Sealed this  
Twelfth Day of March, 2013

Teresa Stanek Rea  
*Acting Director of the United States Patent and Trademark Office*